Aug. 22, 1933.  L. W. BOWEN  1,923,072
SOUND REPRODUCING DEVICE
Filed April 13, 1929  2 Sheets-Sheet 1

INVENTOR.
Lester W. Bowen
BY Duell, Dunn & Anderson
ATTORNEYS.

Aug. 22, 1933.  L. W. BOWEN  1,923,072
SOUND REPRODUCING DEVICE
Filed April 13, 1929   2 Sheets-Sheet 2
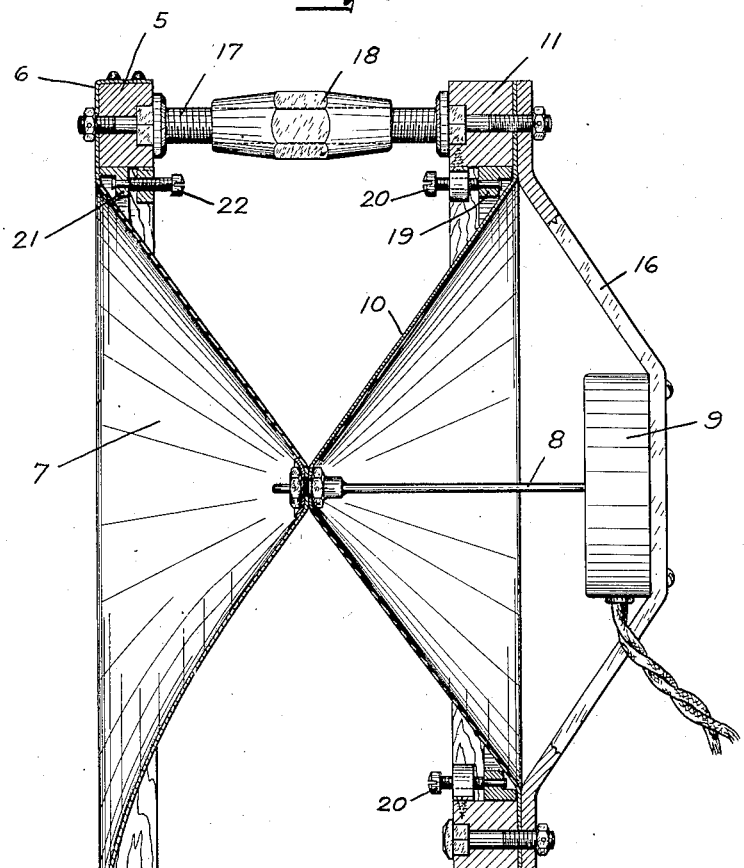
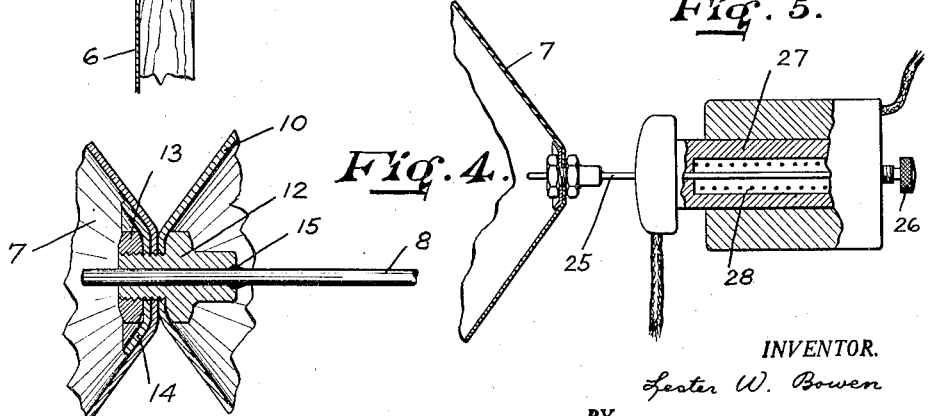
INVENTOR.
Lester W. Bowen
BY Duell, Dunn & Anderson
ATTORNEYS.

Patented Aug. 22, 1933

1,923,072

UNITED STATES PATENT OFFICE 1,923,072

SOUND REPRODUCING DEVICE

Lester W. Bowen, Larchmont, N. Y., assignor to Trans-Lux Daylight Picture Screen Corporation, New York, N. Y., a Corporation of Delaware Application April 13, 1929. Serial No. 354,731

29 Claims. (Cl. 88—16.2)

This invention relates to a screen and aims to provide a device of this nature presenting functionally and structurally improved characteristics.

While the features of the present invention may be employed to advantage in numerous different associations, they will be of particular value when utilized in connection with the simultaneous rendition of acoustical and light effects.

More particularly, it is an object of the invention to construct a screen which will be suitable for the display of light images such as motion pictures and which screen will embody characteristics such that acoustical effects may be had which will be in synchronism with or incidental to the light images upon the screen, it being of course obvious that the screen of itself, will serve as an excellent image receiving and displaying surface if acoustical effects are entirely omitted, or which will act as a very desirable sound reproducer and amplifier without the projection of light images.

However, when the apparatus is subjected to its ordinary and combined use, it is an object of this invention to produce a screen serving effectually to reproduce tones faithfully over the entire acoustical range, and by means of which the tone effects will seem truly to emanate from their normal source of origin as depicted by the light images upon the screen.

A further object of the invention resides in the provision of a reproducer which will respond evenly over the entire acoustical range with no especial emphasis on tones of a certain wave frequency or the over-tones or harmonics of such tones. As a consequence, the volume of sound emanating from the screen may be controlled accurately from pianissimo to crescendo and the value of the individual notes will be in exact proportion to the value originally given them at their source, whether such source be in the nature of a record or an original transmission.

A still further object of this invention is that of constructing a screen in which light absorption will occur to a minimum extent. Thus, the difficulties heretofore experienced in this connection will be overcome. In other words, the light images will be clear-cut and brilliant where a normal and proper source of illumination is provided and these rays will not pass through or be absorbed by a screen as heretofore where it has been necessary to have a screen of somewhat porous material to permit of the passage of sound waves emanating from amplifiers positioned to the rear of the screen.

Another object of the invention is that of constructing a reproducer in which the propagation of "echo" effects or drum or other objectionable sounds is practically entirely eliminated, the present invention furthermore serving to provide a reproducer which may be tuned and which additionally may have its several parts adjusted readily to provide for a constant factor of tone amplification, under predetermined conditions of operation.

Still another object is that of providing an apparatus of this nature which will be of great value when employed in connection with the ordinary or front projection of light images, but by means of the present invention, the apparatus is not limited in this connection in that a structure is presented by means of which the rear projection of light images may be resorted to, the latter projection affecting in no way the desirable qualities of the reproducer as heretofore noted.

An additional object is that of furnishing a device of the nature set forth in the preceding paragraphs and which will involve a relatively simple construction embodying a few parts, individually rugged in construction and these parts, when "set up" furnishing a device capable of being manufactured for a comparatively small amount and operating over long periods of time with freedom from mechanical and other difficulties.

With these and other objects in mind, reference is had to the attached sheets of drawings illustrating one practical embodiment of the invention, and in which:

Fig. 3 is an enlarged sectional side view of a portion of the screen;

Fig. 4 is a fragmentary and further enlarged view of a connection which is preferably employed in the apparatus as shown in Fig. 3; and Fig. 5 is a view similar to Fig. 3 but showing a slightly different construction than that illustrated in the former figure.

In these views, the numeral 5 indicates a frame of any suitable construction and to which material 6 is secured. This material may, obviously, be of any desired character. For example, and in the event that front-projection is resorted to, it may be opaque and present a roughened or smooth image receiving surface. However, in the illustrated embodiment of the invention, the apparatus has been shown as being of the rear-projection type, and with this in mind the material is translucent including, for example, a fabric base impregnated and/or covered with layers of suitable substance. A material suitable in this connection is disclosed for example in the United States applications of Payne and Newman filed November 28, 1925, Serial No. 72,029, and filed April 25, 1929, Serial No. 358,166, said first application having issued Oct. 4, 1932 as Patent 1,881,128.

Figure 1:
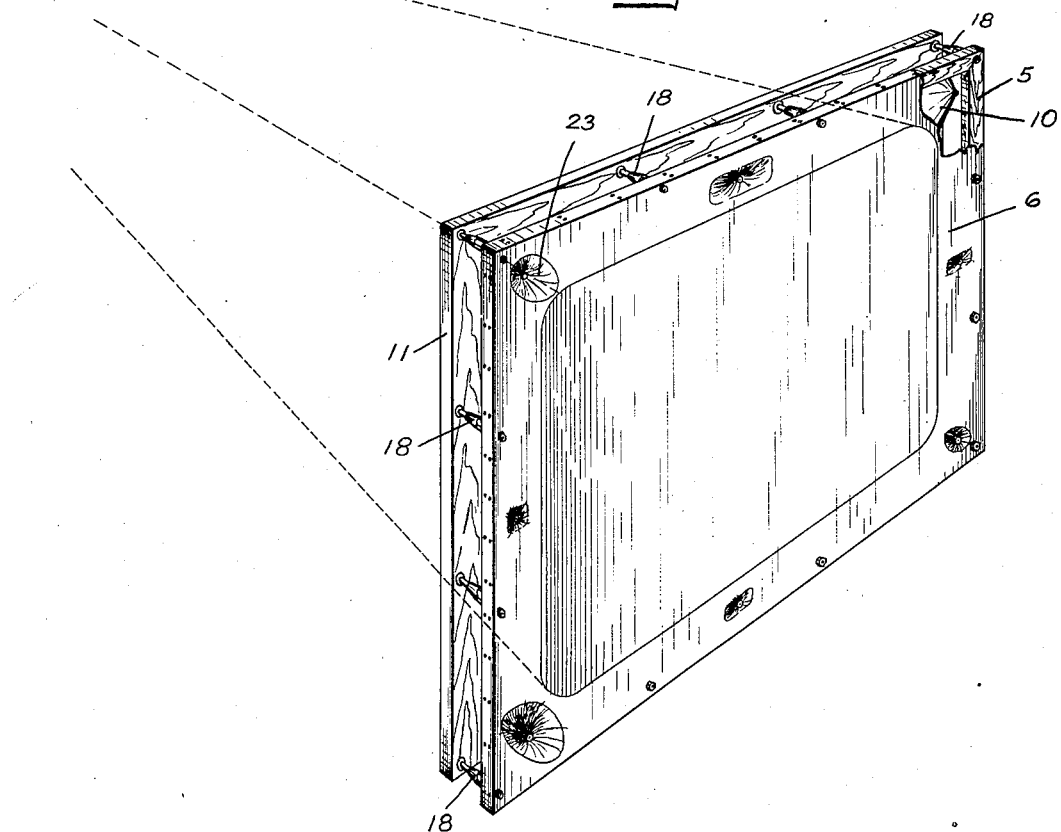
Fig. 1 is a perspective view of a screen and reproducer.
Figure 2:
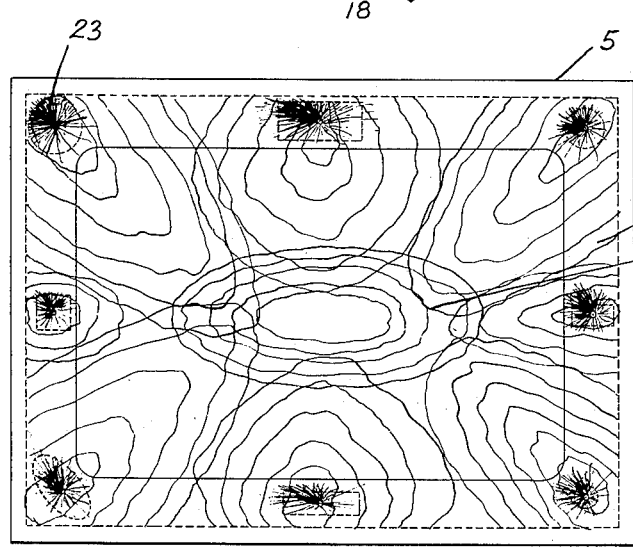
Fig. 2 is a face view thereof.

In any event, the screen is of sufficient area to provide for a light image, as shown in Figs. 1 and 2, and it possesses either adequate inherent rigidity or, in the case of flexible material, is mounted under sufficient tension on the frame to have the light-image receiving portion of its body extending in a substantially single plane. As shown, the material 6 is flexible and with this in mind portions 7 thereof are drawn rearwardly to place these portions under suitable tension, and they are connected with the operating stems 8 of suitable units 9. Obviously, under normal conditions, a great amount of strain would be thrown upon these stems, and with a view to avoiding difficulties in this connection a strain balancing medium is provided. In the embodiment illustrated this medium may be a sheet of material 10 mounted upon a supporting frame 11 which, to this end, is formed with an opening of an area substantially approximating that of the medium 10. It will, accordingly, be obvious that the rearwardly drawn portions 7 of the sheet 6 act as diaphragms, the tension of which is maintained by the supporting diaphragm 10 and the cooperative effect of both of these diaphragms resulting in a balanced condition such, that no strain is transmitted by either of them to the operating stem 8. A coupling of the apices of the diaphragms 7—10 is achieved as, for example, by forming their adjacent portions with openings through which a bored plug 12 is passed, the latter, in conjunction with a nut 13 and washers 14, serving to connect these portions of the diaphragms. When these parts are balanced it is obvious that it will be a simple matter to pass the operating stem 8 through the bore of the plug and then, by utilizing, for example, solder 15 or any other suitable coupling medium, the stem may be secured against movement with respect to the diaphragms.

The frame 11, in addition to acting as a mounting for the diaphragms 10, serves as, for example, by brackets 16, to mount the units 9. Additionally, it serves as a baffle board to increase to a desirable degree, the resonance of the entire apparatus and to improve the quality of sound waves propagated by the diaphragms 7.

Now, with a view to providing means which will serve as an adjusting medium for varying the effective tension on the diaphragms, a number of convenient structures may be employed. Likewise, a number of different mechanisms may be utilized for varying the effective area of the diaphragms. In the embodiment illustrated merely the simplest forms of such mechanisms have been shown, and the first includes a pair of oppositely threaded rods 17 extending one from each of the frames 5 and 11, which rods are coupled by nuts 18 so that the frames may be drawn closer together or readily forced farther apart, as may be desired. The second form of mechanism may include a frame corresponding, in outline, to that opening of the member 11, within which it is positioned. This frame has been shown at 19 and may be forced into or drawn out of contact with the diaphragm 10 by actuating shifting screws 20. The construction preferably employed in conjunction with the frame 5 merely includes a bar 21 actuated by operating members 22 in order to achieve the results desired.

Thus it is feasible to vary the tension imposed upon each diaphragm and, additionally, it becomes possible to vary the area of such diaphragm. As a consequence, each diaphragm may be tuned to primarily respond to a certain fundamental tone, and the over-tones and harmonics of such tone, it being, of course, obvious that the unit 9 may also be of the "tuned" type. In other words, the entire construction of the unit may be such that it primarily, and with greatest emphasis, responds to that fundamental tone, and its overtones, etc., which the diaphragm to which it is connected primarily responds.

Now considering a further development of this phase of the invention, it will be apparent to those skilled in the art that, as has been shown in Figures 1 and 2, the diaphragm portions 23 may each have a different initial area and/or configuration. Consequently, an approximation of the tuning required may be had at the time of the initial manufacture and "Set up", and it will only be necessary to resort to the adjustments provided for this purpose in order accurately to tune each reproducing portion of the screen throughout the shadings of the note to respond faithfully and primarily to the true tone or note. The diaphragm portions are of such number as to cover the entire range of tones and half-tones and are so proportioned that no especial predominant amplification will occur on any certain note or number of notes, and as a consequence, the entire tone range will be reproduced faithfully. As has been shown in Figure 2, the propagation of sound waves are necessarily limited in one direction by the frame. In another direction they travel into the body of the screen. However, while different screen portions serve primarily to reproduce different fundamental tones and while certain of the areas of these portions overlap the areas of other portions it may, with propriety, be stated that these portions or zones are substantially isolated from each other, the degree of distinction being, of course, governed by the contour and area of the diaphragm which propagates the sound waves typical of such area.

It has been found, according to the present invention, that the center portion of the screen is substantially inert from an acoustical standpoint and that, unless especially provided for, none of the several actuating units and the diaphragm portions associated therewith, serve primarily to propagate base notes or tones. However, these tones are propagated by the central portion of the screen and in substantially the area indicated at 24. As a consequence of the central portion of the screen being inert, no drum sounds are propagated in that the lines of demarcation of the area 24 are quite sharply defined in practice, and consequently no echoing or reverberating effect results which would normally tend to continue a tone after its proper interval of propagation.

In operation it will be appreciated that any desired type of unit or units might be employed and from which the operating stems extend. The frame 5, together with the screen material mounted thereby, is set up and if such material be flexible, portions thereof are placed under tension and this condition of tension is balanced as, for example, by the tension supporting diaphragms shown. The diaphragms—if more than one is employed (and this is preferably the case)—are preferably of the tuned type. In other words, they have different effective areas and respond primarily to different fundamental tones, together with the harmonics and overtones of such notes. Moreover, the diaphragms are of such number that they cover the entire effective range without especial or unnatural emphasis on any particular tone or series of tones. The base notes, as afore brought out, are, according to the present invention, preferably propagated by a certain sub-area or diaphragm portion of the screen and, incident to the comparative isolation of each one of these several diaphragm portions, a continuance of sound wave propagation after the cessation of vibration on the part of the operating stems is effectually precluded. Finally, the baffle board serves, in addition to its mechanical functions of support, as an effective sounding instrumentality which increases the depth and richness of the sounds emanating from the screen.

At this time, it will be appreciated that the units which serve to actuate the diaphragm or sound reproducing portion of the present apparatus might be of any desired type. For example, in certain instances, it may be preferable to employ units of the magnetic type while in other installations dynamic units may be utilized to best advantage. Obviously, any other desired types of units may also be employed and while these units may in themselves be tuned, this is not necessary, in view of the fact that by employing tuned diaphragm portions, excellent results are achieved. Additionally, in certain instances, it may be desirable to eliminate the stress-balancers provided by the material portions or cones 10. This may be done readily without throwing undue strain upon the operating part of the units by for example employing the structure or a similar structure to that shown in Fig. 5.

In this view, the diaphragm portions 7 are attached directly, one to each of the driving pins or operating stems 25 of the units. The tension of this pin or stem may be adjusted for example by a screw 26 extending from the unit and the bore of the core 27 may be sufficiently great to accommodate a spring 28 serving to balance the strain exerted upon the pin or stem 25 by the diaphragm 7. Thus the desired results are achieved.

From the foregoing it will be appreciated that among others, the several objects of the invention specifically afore stated are achieved. While, according to the present invention and as shown the characteristics thereof are in many respects primarily and ideally adapted for rear projection of light images, nevertheless, it will be apparent that these features of the invention are not necessarily limited to use in this connection, but might with facility be employed to advantage on front light projection. Additionally, certain of the features might be eliminated or modified and the mechanical construction employed to achieve the results desired might be varied in numerous respects without departing from the spirit of the invention as defined by the claims.

Having described my invention, what I claim as new and desire to secure by Letters Patent, is:

1. A device of the character described including a screen having an area to receive a light image, and diaphragm portions forming a part of said screen and at points beyond said area.

2. A device of the character described including, in combination, a screen of translucent material to receive a rear-projected light image visible from the front of said screen, and a unit connected to said screen to vibrate the same to produce audible sound waves and arranged outside the path of light rays to be projected against the rear face of said screen.

3. A device of the character described including, in combination, a translucent screen to receive a rear-projected light image visible from the front of said screen and having portions extending beyond the area to receive the light image, and a unit connected to said screen to vibrate the same, the connection of said unit being disposed at a point beyond the area normally occupied by said light image.

4. A device of the character described including a screen to receive a light image, means defining differently tuned substantially independent sound reproducing portions forming a part of said screen, and operating units connected to said portions of the screen.

5. A device of the character described including, in combination, a screen to receive a light image, differently tuned reproducing units disposed adjacent said screen and forming parts integral with the same and beyond the area thereof which receives said light image, and means for operating said units.

6. A device of the character described including a screen to receive a light image, diaphragm portions forming a part of said screen, means for vibrating said portions to produce sound waves, and means cooperating with said screen to cause the same to present areas acoustically isolated from each other and adjacent the respective diaphragm portions.

7. A device of the character described including a screen to receive a light image, means for vibrating portions of said screen to produce sound waves above a predetermined frequency and means cooperating with said screen to tension the same to have portions of its body reproduce sound waves below such frequency.

8. A device of the character described including a screen to receive a light image, means for vibrating portions of said screen to produce sound waves above a predetermined frequency and means cooperating with said screen to tension the same to have portions of its body remote from the side edges thereof reproduce sound waves below such frequency, the central portion of said screen being substantially acoustically inert.

9. A device of the character described including a screen, tensioned diaphragm portions forming part of said screen, means coupled to said diaphragm portions for producing audible sound waves adjacent the light image receiving surface of said screen, and means acting as a sounding board connected to said screen and disposed adjacent thereto.

10. A device of the character described including a screen to receive a light image, tensioned diaphragm portions forming a part of said screen, a baffle board disposed adjacent said screen, and a means connected to said baffle board and said diaphragm portions adjacent the light image receiving portion of said screen to produce sound waves.

11. A device of the character described including a screen to receive a light image, tensioned diaphragm portions forming a part of said screen, units connected to said portions to vibrate the same to produce sound waves, and means for substantially balancing the stress normally exerted upon said units incident to the tension of said diaphragms.

12. A device of the character described including a screen to receive a light image, tensioned diaphragm portions forming a part of said screen, units connected to said portions to vibrate the same to produce sound waves, means for substantially balancing the stress normally exerted upon said units incident to the tensioning of said diaphragms, a support serving as a baffle board positioned adjacent to and connected with said screen, and said units being associated with said support.

13. A device of the character described including a sounding board, a light image receiving screen, tensioned diaphragm portions forming a part of said screen, sound reproducing units associated with said portions and adjacent the light image receiving area of said screen, and means for tuning said units.

14. A device of the character described including a screen of flexible material, portions of said screen being drawn rearwardly to provide diaphragms, means connected to said diaphragms to vibrate the latter at acoustic frequencies, means for tensioning said diaphragms, means for balancing the stress transmitted to said diaphragms incident to their conditions of tensioning, and means for varying the effective area of said diaphragms to tune the same.

15. A device of the character described including a screen of flexible material, portions of said screen being drawn rearwardly to provide diaphragms, units connected to said diaphragms to vibrate the latter at acoustic frequencies, means for tensioning said diaphragms, and means forming a part of said units and connected to said diaphragms to balance the condition of stress imposed upon the units incident to the tensioning of said diaphragms.

16. An apparatus of the character described including a sheet of translucent material, portions of said sheet being drawn rearwardly to provide tensioned diaphragms, operating units connected to said diaphragms to vibrate the same at acoustical frequencies, a supporting frame acting as a baffle board, said units being associated with said frame, means for tensioning and tuning said diaphragms, means for balancing the strain normally imposed upon said units incident to the tensioning of said diaphragms, said diaphragms and units being located beyond the area which receives the light image and the latter being rear-projected and being visible from the front of said sheet.

17. A combined picture screen and sound reproducer comprising a screen, a plurality of differently tuned screen vibrating means positioned with respect to different portions of said screen, operative connections between said screen and said plurality of screen vibrating means whereby operation of said latter means vibrates different portions of said screen at different frequencies.

18. A reproducer including a body to act as a light image receiving surface, said body extending beyond the area to receive said light images and furnishing a border portion, units attached to said portion and to vibrate the same at frequencies such that audible sounds will result, and means whereby such portion of the body at least adjacent the points of attachment of said units will serve as diaphragm areas and other portions of said body will serve as a sounding board.

19. A reproducer including a body to act as a light image receiving surface, said body extending beyond the area to receive said light images and furnishing a border portion, units attached to said portion and to vibrate the same at frequencies such that audible sounds will result, said body comprising a relatively untensioned sheet of material.

20. A reproducer including a body to act as a light image receiving surface, said body extending beyond the area to receive said light images and furnishing a border portion, units attached to said portion and to vibrate the same at frequencies such that audible sounds will result, and means for substantially isolating said border portion, from the remainder of said body.

21. A reproducer including a body to act as a light image receiving surface, said body extending beyond the area to receive said light images and furnishing a border portion, units attached to said portion and to vibrate the same at frequencies such that audible sounds will result, and means for substantially isolating as diaphragm areas those portions of the body which are adjacent the points of attachment of said units from the remainder of said body whereby the latter will act as a sounding board and the isolated portions will function as diaphragms.

22. A reproducer including a body of material to provide a light image receiving surface, and a border portion extending beyond the area of the light image surface, a series of units connected to said border portion and around the entire area thereof, said body providing diaphragm areas adjacent the points of connection of said units, and the light image receiving area of said screen acting as a sounding board for the tones emanating from said diaphragm areas.

23. A reproducer including a sheet of material, a frame for mounting the edge portions of said sheet to retain the same substantially against movement, said sheet providing a single area to receive a light image and a border portion beyond the same extending towards said frame, means associated with said border portion to furnish diaphragm areas within the same, units connected to said frame and resilient means extending between said units and said diaphragm areas to vibrate the latter at audible frequencies and to permit with freedom from acoustical distortion movements of said areas slightly different from those which said units tend to impart thereto.

24. A reproducer including a screen to receive a light image, units, coupling means extending to both sides of said screen and connecting the latter to said units at points beyond the screen area which is to receive the light image, and portions of said screen acting as a sounding board for sounds emanating from the areas of said screen adjacent the point of connection of the latter to said units.

25. A reproducer including a screen to receive a light image, a border portion forming a part of said screen, reproducing units located wholly to one side of said screen, coupling means extending to both sides of said border portion and connecting the latter to said units and portions of said screen acting as a sounding board for sounds emanating from the areas of said screen adjacent the point of connection of the latter to said units.

26. A reproducer including a screen, a border portion forming a part of said screen, a reproducing unit, and a diaphragm connected to both of the same to couple said unit to said border portion and cause the area of the latter adjacent said point of coupling to additionally act as a secondary diaphragm.

27. A reproducer including a screen, a border portion forming a part of said screen, units for setting up acoustical vibrations located adjacent one face of the latter, operating stems extending from said units and coupling means disposed adjacent both faces of said screen and securing said stems to said border portion.

28. A reproducer including a sheet of translucent material to receive a rear projected light image, a border portion forming a part of said sheet, a unit for setting up acoustical vibrations located behind the inner face of said sheet and means for coupling said unit to the outer face of said border portion to have an area of the latter act as a diaphragm.

29. A reproducer including a body of material to provide a light image receiving surface and a border portion extending beyond the area of the light image surface, a series of units connected to said border portion and around the entire area thereof, said body providing diaphragm areas adjacent the points of connection of said units, means for substantially acoustically isolating the diaphragm areas from the remainder of said extended portion, and the light image receiving area of said screen acting as a sounding board for the tones emanating from said diaphragm areas.

LESTER W. BOWEN.